US012151498B2

(12) United States Patent
Fisher

(10) Patent No.: US 12,151,498 B2
(45) Date of Patent: Nov. 26, 2024

(54) MULTI-PURPOSE PHENOL-FREE DIRECT THERMAL RECORDING MEDIA

(71) Applicant: Appvion, LLC, Appleton, WI (US)

(72) Inventor: Mark R. Fisher, Appleton, WI (US)

(73) Assignee: Appvion, LLC, Appleton, WI (US)

( * ) Notice: Subject to any disclaimer, the term of this patent is extended or adjusted under 35 U.S.C. 154(b) by 284 days.

(21) Appl. No.: 17/118,217

(22) Filed: Dec. 10, 2020

(65) Prior Publication Data

US 2022/0184986 A1 Jun. 16, 2022

(51) Int. Cl.
*B41M 5/333* (2006.01)
*B41M 5/323* (2006.01)

(52) U.S. Cl.
CPC .......... *B41M 5/3333* (2013.01); *B41M 5/323* (2013.01); *B41M 2205/04* (2013.01)

(58) Field of Classification Search
CPC .... B41M 5/323; B41M 5/333; B41M 5/3333; B41M 2205/04
See application file for complete search history.

(56) References Cited

U.S. PATENT DOCUMENTS 3,539,375 A 11/1970 Baum
3,674,535 A 7/1972 Blose et al.
3,746,675 A 7/1973 Blose et al.
4,094,687 A 6/1978 Lawton
4,097,288 A 6/1978 Lawton
4,151,748 A 5/1979 Baum
4,169,705 A 10/1979 Boyd et al.
4,181,771 A 1/1980 Hanson et al.
4,246,318 A 1/1981 Baum
4,470,057 A 9/1984 Glanz
4,531,140 A 7/1985 Suzuki et al.
4,794,102 A 12/1988 Petersen et al.
5,098,882 A 3/1992 Teraji et al.
5,215,812 A 6/1993 Kano et al.
5,342,649 A 8/1994 Sarokin
5,773,186 A 6/1998 Takashima (Continued)

FOREIGN PATENT DOCUMENTS

EP 1024409 A2 8/2000
EP 1 116 713 A1 7/2001

(Continued)

OTHER PUBLICATIONS

PCT Written Opinion for PCT/US2020/064342, dated Aug. 12, 2021, 6 pages.

(Continued)

*Primary Examiner* — Gerard Higgins
(74) *Attorney, Agent, or Firm* — Amundsen Davis, LLC

(57) ABSTRACT

Non-phenolic direct thermal recording media have a thermally responsive layer containing a leuco dye and a plurality of non-phenolic developers including 1,3-diphenyl urea (DPU) and urea urethane (UU). This chemistry enables multi-purpose recording materials capable of withstanding multiple different types of environmental conditions or agents—such as a water soak, contact with polyvinyl chloride meat wrapping film, boiling water, dry and humid heat, sunlight, and contact with hand sanitizer. The unique non-phenolic chemistry allows the product's thermally responsive layer to have an ultra-low coat weight, less than 1.48 $g/m^2$.

18 Claims, 1 Drawing Sheet

(56) References Cited

U.S. PATENT DOCUMENTS

| | | | |
|---|---|---|---|
| 5,955,398 | A | 9/1999 | Fisher et al. |
| 6,015,771 | A | 1/2000 | Fisher et al. |
| 6,429,341 | B2 | 8/2002 | Mathiaparanam |
| 6,777,075 | B2 | 8/2004 | Concannon et al. |
| 6,835,691 | B2 | 12/2004 | Mathiaparanam et al. |
| 6,921,740 | B1 | 7/2005 | Hizatate et al. |
| 6,995,784 | B2 | 2/2006 | Kalishek |
| 7,125,824 | B2 | 10/2006 | Mathiaparanam et al. |
| 7,235,308 | B2 | 6/2007 | Druckrey et al. |
| 7,262,150 | B2 | 8/2007 | Kalishek et al. |
| 7,361,399 | B2 | 4/2008 | Song et al. |
| 7,476,448 | B2 | 1/2009 | Natsui et al. |
| 7,485,402 | B2 | 2/2009 | Arai et al. |
| 7,635,662 | B2 | 12/2009 | Kabashima et al. |
| 7,749,580 | B2 | 7/2010 | Song et al. |
| 7,807,738 | B2 | 10/2010 | Kabashima et al. |
| 8,287,961 | B2 | 10/2012 | Hill et al. |
| 8,334,047 | B2 | 12/2012 | Kelly et al. |
| 8,460,774 | B2 | 6/2013 | Bethe |
| 8,480,225 | B2 | 7/2013 | Romano, Jr. et al. |
| 8,536,087 | B2 | 9/2013 | Harrison et al. |
| 8,563,468 | B2 | 10/2013 | Kodama et al. |
| 8,709,546 | B2 | 4/2014 | Zhou et al. |
| 8,795,796 | B2 | 8/2014 | Koenig |
| 8,802,591 | B2 | 8/2014 | Hill et al. |
| 8,877,678 | B2 | 11/2014 | Koyama et al. |
| 8,916,496 | B2 | 12/2014 | Chakar et al. |
| 8,916,497 | B2 | 12/2014 | Fisher et al. |
| 9,034,790 | B2 | 5/2015 | Chakar et al. |
| 9,199,503 | B1 | 12/2015 | Fisher et al. |
| 9,418,576 | B2 | 8/2016 | Franklin |
| 9,534,156 | B2 | 1/2017 | Fisher |
| 9,656,498 | B2 | 5/2017 | Yamane et al. |
| 9,767,714 | B2 | 9/2017 | Franklin |
| 9,789,721 | B2 | 10/2017 | Takano et al. |
| 9,962,980 | B2 | 5/2018 | Morie et al. |
| 10,160,245 | B2 | 12/2018 | Horn |
| 10,184,062 | B2 | 1/2019 | Einsla et al. |
| 10,265,985 | B2 | 4/2019 | Horn |
| 10,933,681 | B2 | 3/2021 | Chakar et al. |
| 11,292,280 | B2 | 4/2022 | Fisher et al. |
| 11,370,241 | B2 | 6/2022 | Fisher et al. |
| 11,376,879 | B2 | 7/2022 | Fisher |
| 11,529,819 | B2 | 12/2022 | Sakai et al. |
| 11,718,103 | B2 | 8/2023 | Fisher et al. |
| 2001/0044553 | A1 * | 11/2001 | Kabashima .......... B41M 5/3333 560/163 |
| 2004/0096598 | A1 | 5/2004 | Kasamatsu et al. |
| 2004/0096599 | A1 | 5/2004 | Kobayashi et al. |
| 2004/0191433 | A1 | 9/2004 | Sakaguchi et al. |
| 2005/0096221 | A1 | 5/2005 | Fisher et al. |
| 2007/0042907 | A1 | 2/2007 | Nagasawa et al. |
| 2009/0086032 | A1 | 4/2009 | Li |
| 2009/0155613 | A1 | 6/2009 | Kalishek |
| 2009/0286032 | A1 | 11/2009 | Franklin |
| 2011/0104619 | A1 | 5/2011 | Fujii et al. |
| 2011/0285122 | A1 | 11/2011 | Hill et al. |
| 2016/0031254 | A1 | 2/2016 | Neukirch et al. |
| 2017/0365195 | A1 | 12/2017 | Franklin |
| 2019/0193447 | A1 | 6/2019 | Fisher et al. |
| 2019/0270328 | A1 | 9/2019 | Kishimoto et al. |
| 2019/0291493 | A1 | 9/2019 | Fisher et al. |
| 2021/0155027 | A1 | 5/2021 | Fisher |
| 2021/0340099 | A1 | 11/2021 | Kinishi et al. |
| 2022/0184985 | A1 | 6/2022 | Fisher |
| 2022/0184986 | A1 | 6/2022 | Fisher |
| 2022/0332135 | A1 | 10/2022 | Fisher |
| 2023/0279615 | A1 | 9/2023 | Fisher et al. |

FOREIGN PATENT DOCUMENTS

| | | | | |
|---|---|---|---|---|
| EP | 1565614 | B1 | | 7/2007 |
| EP | 3103649 | A1 | | 12/2016 |
| EP | 3677569 | A1 | | 7/2020 |
| JP | 8-2112 | A | | 1/1996 |
| JP | H082112 | A | | 1/1996 |
| JP | 2578069 | B2 | | 2/1997 |
| JP | 2002187364 | A | * | 7/2002 |
| JP | 2002283744 | A | | 10/2002 |
| JP | 2004223871 | A | | 8/2004 |
| JP | 2004255842 | A | | 9/2004 |
| JP | 2008194986 | A | | 8/2008 |
| JP | 4721432 | B2 | | 7/2011 |
| JP | 2012061612 | A | | 3/2012 |
| JP | 2016 068418 | A | | 5/2016 |
| JP | 2016182799 | A | | 10/2016 |
| JP | 2017177346 | A | | 10/2017 |
| JP | 2018065338 | A | | 4/2018 |
| JP | 2019077101 | A | | 5/2019 |
| JP | 2019084758 | A | | 6/2019 |
| JP | 2019130879 | A | | 8/2019 |
| JP | 6586915 | B2 | | 10/2019 |
| JP | 2020082406 | A | | 6/2020 |
| KR | 20170073100 | A | | 6/2019 |
| WO | 2018139183 | A1 | | 8/2018 |
| WO | 2018225663 | A1 | | 12/2018 |
| WO | 2019044462 | A1 | | 3/2019 |
| WO | 2019049619 | A1 | | 3/2019 |
| WO | 2019130968 | A1 | | 7/2019 |
| WO | 2023100900 | A1 | | 6/2023 |
| WO | 2023100902 | A1 | | 6/2023 |

OTHER PUBLICATIONS

PCT Written Opinion for PCT/US2021/062598, dated Apr. 7, 2022, 8 pages.
Aquasol™ Water Soluble Paper and Tape brochure, 2019 or earlier, 4 pages.
Avery Dennison™ FreshMarx™ flyer, 2018, 1 page.
FreshMarx™ flyer, "Trust Your Food Safety", 2010, 1 page.
Neenah™ Dispersa™ for Labels 7630P0 brochure, Oct. 2020, 1 page.
Neenah™ Dispersa™ for Tag and Boardstock brochure, Jul. 2020, 1 page.
Smartsolve™ Product Data Sheet, Jul. 21, 2015, 2 pages.
PCT "International Search Report" and "Written Opinion" for PCT/US2023/029518 of Nov. 23, 2023, 12 pages.
Office Action for Japanese Patent Application No. 2023-534746 issued on May 24, 2024, 5 pages filed herewith.
Written Opinion of the IPEA for PCT/US2023/029518 dated Jun. 27, 2024, 6 pages filed herewith.

* cited by examiner

MULTI-PURPOSE PHENOL-FREE DIRECT THERMAL RECORDING MEDIA

FIELD OF THE INVENTION

The present invention relates to sheet-like recording materials adapted to be recorded on or printed on by conventional direct thermal recording techniques. The invention also relates to direct thermal recording media, with particular application to such media that incorporate a leuco dye and an acidic developer to provide a heat-activated printing mechanism. The invention also pertains to related methods, systems, and articles.

BACKGROUND OF THE INVENTION

In direct thermal recording, an image is produced by selectively heating the recording material (sometimes called coated thermochromic paper, thermal paper, thermal recording material or media, or thermally-responsive record material) at selected locations by passing the material under, or otherwise across, a thermal print head. The recording material includes a coating of a thermally responsive layer, and the image is provided by a heat-induced change in color of the thermally responsive layer. Some common uses of direct thermal recording may include, without limitation, cash register receipts, labels for food or other goods, or event tickets.

Numerous types of direct thermal recording media are known. See, for example, U.S. Pat. No. 3,539,375 (Baum); U.S. Pat. No. 3,674,535 (Blose et al.); U.S. Pat. No. 3,746,675 (Blose et al.); U.S. Pat. No. 4,151,748 (Baum); U.S. Pat. No. 4,181,771 (Hanson et al,); U.S. Pat. No. 4,246,318 (Baum); and U.S. Pat. No. 4,470,057 (Glanz). In these cases, basic colorless or lightly colored chromogenic material, such as a leuco dye, and an acidic color developer material are contained in a coating on a substrate which, when heated to a suitable temperature, melts or softens to permit the materials to react, thereby producing a colored mark or image at the spot where the heat is applied. Thermally-responsive record materials have characteristic thermal responses, desirably producing a colored image of sufficient intensity or contrast upon selective thermal exposure.

Depending on how such recording materials are used, they can be exposed to certain contaminants or environmental conditions. For example, direct thermal media used as labels in pharmaceutical applications may be exposed to hand sanitizing liquid. Direct thermal media used in other applications may be exposed to environmental agents or conditions peculiar to such applications, such as sweat (water), heat and/or humidity, sunlight, or meat wrapping film, to name a few. Ideally, a bar code or other image thermally printed on a direct thermal recording material should remain visible and functional when exposed to such agents. But designing such capabilities into a direct thermal product can be difficult and is not always possible or practical. Independent of these issues, concerns were raised many years ago about the presence of phenol-based chemicals in direct thermal recording materials. Originally, phenol material was present in the thermally responsive layer of the thermal recording material, and more specifically, in the developer chemical that reacts with the leuco dye in that layer to produce a thermally-induced change of color. Alternative, phenol-free developer chemicals were developed to address these concerns. One group of such chemicals was introduced by Ciba Specialty Chemical Corp. about 20 years ago under the brand Pergafast™, including Pergafast 201 (3-(3-Tosylureido)phenyl p-toluenesulfonate). This developer is still widely used today in the manufacture of phenol-free direct thermal recording materials. Some other known phenol-free developers include NKK 1304 (N-[2-(3-Phenylureido)phenyl]benzenensulfonamide) sold by Nippon Soda Co. Ltd., Tolbutamide (1-butyl-3-(4-methylphenyl) sulfonyl urea), and Dapsone (4,4'-Diamino Diphenyl Sulfone).

SUMMARY OF THE INVENTION

We have discovered a unique developer chemistry for use in the thermally responsive layer of direct thermal recording materials. Besides being non-phenolic, the unique chemistry can be used to make direct thermal recording materials that are capable of withstanding multiple different types of environmental conditions or agents, and to that extent these recording materials can be described as multi-purpose. The unique chemistry uses a combination of two non-phenolic developers, neither of which by itself (when used with a suitable leuco dye) can produce direct thermal recording materials with such characteristics, but when combined together provide surprising and unexpected results. The two developers are 1,3-diphenyl urea ("DPU"), and urea urethane ("UU"). Furthermore, we have found that the unique chemistry makes it possible for the thermally responsive layer of the product to have an ultra-low coat weight, i.e. to be ultra-thin. This allows for reduced product mass and a number of related benefits, including a reduction in the post-use waste stream associated with direct thermal recording materials for an improved environmental impact.

We have thus developed a new family of phenol-free direct thermal recording materials or media. These materials are configured for direct thermal imaging, and the thermal images so produced can be robust enough to withstand multiple different environmental conditions or agents. The materials use a combination of two non-phenolic developers, neither one of which by itself can produce a direct thermal recording material having the desired multi-purpose functionality.

We therefore disclose herein, among other things, recording media that include a substrate and a thermally responsive layer carried by the substrate. The recording media is substantially phenol-free, and the thermally responsive layer includes a leuco dye and a plurality of developers including 1,3-Diphenyl urea (DPU) and urea urethane (UU).

The recording media may further include a basecoat layer between the thermally responsive layer and the substrate, and a topcoat carried by the substrate such that the thermally responsive layer is disposed between the topcoat and the substrate. The thermally responsive layer may have a coat weight of less than 1.48 $g/m^2$ (1 lb/3300 $ft^2$), or in a range from 0.9 to less than 1.48 $g/m^2$. The DPU and the UU may be dispersed throughout the thermally responsive layer. Substantially no developers other than DPU and UU may be present in the thermally responsive layer. The DPU and UU may be present in the thermally responsive layer in a relative weight ratio that falls within a range from ⅓ to 3, or from ½ to 2, or which may be substantially 1.

The print quality of the recording medium when printed with a thermal printer energy setting of 11.7 $mJ/mm^2$ at a print speed of 6 inches per second (ips) may be characterized by an ANSI value (at a wavelength of 650 nm, or at 670 nm, or at both 650 nm and 670 nm) of at least 1.5. The print quality of the printed recording medium may still be characterized by an ANSI value of at least 1.5 after any one, or some, or all of: the printed recording medium is soaked in water for 24 hours and then removed and dried; the printed recording medium is dipped in water, then placed in contact with polyvinyl chloride meat wrapping film under a 7 pound weight for 24 hours, and then removed and dried; the printed recording medium is submerged in boiling water for 20 minutes, then removed and dried; the printed recording medium is heated to 60° C. for 24 hours, then removed and cooled; the printed recording medium is exposed to air at 40° C. and 90% relative humidity for 24 hours, then removed and cooled; the printed recording medium is subjected to an accelerated sunlight test at 0.67 W/m$^2$ for 7 hours, then removed; or one drop of a 70% ethyl alcohol-based hand sanitizer is placed on the printed recording medium and allowed to dry.

We also disclose substantially phenol-free recording media that include a flexible substrate and a thermally responsive layer carried by the substrate, the thermally responsive layer including a leuco dye and a plurality of developers including DPU and UU. The DPU and UU may both be dispersed throughout the thermally responsive layer, and may be present in the thermally responsive layer in a relative weight ratio that falls within a range from ⅓ to 3, or from ½ to 2, or that is substantially 1. A print quality of the recording medium when printed with a thermal printer energy setting of 11.7 mJ/mm$^2$ at a print speed of 6 inches per second (ips) may be characterized by an ANSI value (at 650 nm, 670 nm, or both 650 and 670 nm) of at least 1.5.

The print quality of the printed recording medium may still be characterized by an ANSI value of at least 1.5 after any one, some, or all of: the printed recording medium is dipped in water, then placed in contact with polyvinyl chloride meat wrapping film under a 7 pound weight for 24 hours, and then removed and dried; the printed recording medium is heated to 60° C. for 24 hours, then removed and cooled; or the printed recording medium is exposed to air at 40° C. and 90% relative humidity for 24 hours, then removed and cooled.

We disclose numerous related methods, systems, and articles.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The inventive articles, systems, and methods are described in further detail with reference to the accompanying drawings, of which.

In the figures, like reference numerals designate like elements.

DETAILED DESCRIPTION OF ILLUSTRATIVE EMBODIMENTS

As noted above, we have discovered a unique phenol-free developer chemistry for use in direct thermal recording materials. The new chemistry comprises a combination of two developers which, when used together along with a suitable leuco dye, can produce a multi-purpose direct thermal recording material capable of passing a plurality of environmental exposure tests, but when used individually in an otherwise identical thermal recording material, cannot pass those same environmental exposure tests. In fact, one of the two developers when used alone with a suitable leuco dye yields a direct thermal recording material which, upon being imaged by a direct thermal printer and before any environmental exposure tests are done, produces an image that does not meet even the minimum standard for machine-readability for bar codes. The two phenol-free developers of this unique combination are 1,3-diphenyl urea ("DPU"), and urea urethane ("UU").

The unique chemistry also makes it possible for the thermally responsive layer of the product to have an ultra-low coat weight, i.e. to be ultra-thin. The low coat weight in turn provides lower material costs, lower manufacturing costs, and lower overall product weight or mass. The reduced product mass also then reduces the post-use waste stream associated with direct thermal recording materials, for an improved environmental impact.

Figure 1:
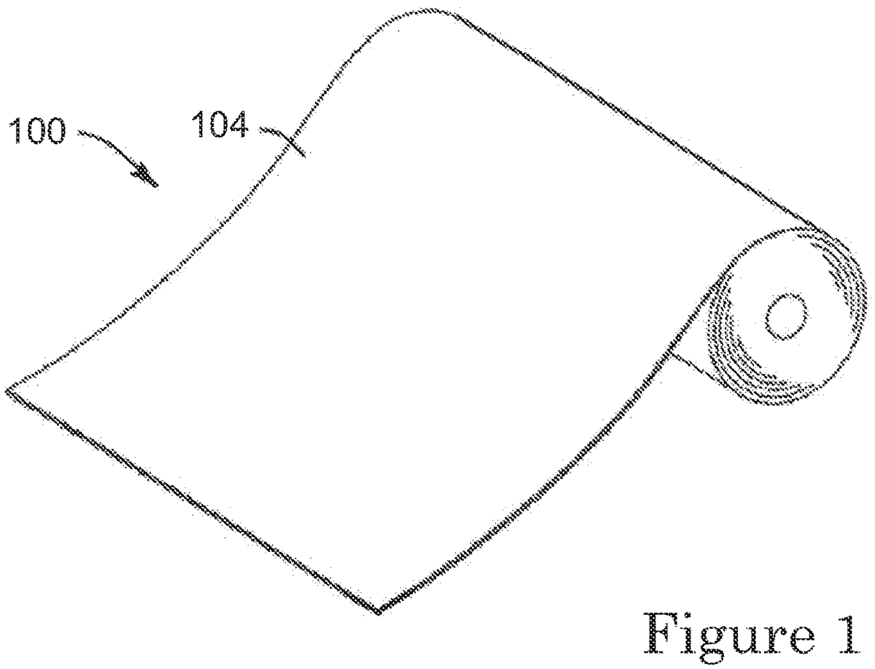
FIG. 1 is a schematic perspective view of a roll of direct thermal recording material or medium.

Direct thermal recording materials are often manufactured in large roll form on industrial-sized coating machines using a continuous web of paper or other flexible substrate material. Such a roll 100 of direct thermal recording material 104 is shown schematically in FIG. 1. After manufacture, the roll 100 can be converted by slitting, cutting, or other standard operations into individual sheets, labels, or smaller rolls. A magnified side or cross-sectional view of the recording material 104 is shown schematically in FIG. 2 to illustrate typical sub-structure made up of component layers or coatings.

The recording material 104 may be made by applying several different coatings to at least one side or major surface 110*a* of a substrate 110. We may refer to the major surface 110*a* as the front surface of the substrate, and the exposed major surface 104*a* may be the front surface of the recording material 104. The opposite major surface 104*b* may be the back surface of the recording material. Briefly, the substrate 110 is coated to carry a basecoat layer 112, a thermally responsive layer 114, and a topcoat layer 116. The coatings are preferably applied in the order shown, with the layer 114 located between the layers 112, 116, and with the layer 112 located between the layer 114 and the substrate 110. In some cases, the basecoat 112 may be omitted, or the topcoat 116 may be omitted, or both the basecoat and the topcoat may be omitted. The coatings can be formed by any suitable coating technique, including roll coating, knife coating, rod coating, gravure coating, curtain coating, spot coating, and so forth. Furthermore, additional layers and coatings can be added to or included with the recording material on its front and/or back side. For example, one or more coatings can be applied to the opposite side of the substrate, i.e., to the major surface 110*b*, as discussed further below. But first, the other elements of the direct thermal recording material 104 will now be described in more detail.

The substrate 110 can be any material onto which the other layers can be coated or applied, and then carried. The kind or type of substrate material is not critical. Generally, the substrate 110 is in sheet or roll form, and may be or include a support member such as a web, ribbon, tape, belt, film, card, or the like. In this regard, a sheet denotes an article having two large (major) surface dimensions and a comparatively small thickness dimension, and in some cases, the sheet may be wound up to form a roll. In that regard the substrate 110 is typically thin and flexible, yet strong enough to withstand forces and tensions experienced in a coating machine, without undue breakage. The substrate 110 can be opaque, transparent, or translucent, and can be colored or uncolored. The substrate material can be fibrous including, for example, paper and filamentous synthetic materials. It can be a film including, for example, cellophane and synthetic polymeric sheets cast, extruded, or otherwise formed. Suitable plastic films include films of polypropylene (including oriented polypropylene (OPP) and biaxially oriented polypropylene (BOPP)), polyethylene (PE), and polyethylene terephthalate (PET). The substrate material can thus be non-cellulosic.

An exemplary substrate 110 may be or include a neutral sized base paper. The thickness of the substrate 110 may depend on its composition, but a typical thickness (caliper) range for cellulosic materials is from 1.9 to 12 mils (e.g. 50 to 300 μm), or other suitable thicknesses. The paper may have a basis weight in a range from 35 to 200 $g/m^2$, but other suitable basis weights may also be used. The paper may also be treated with one or more agents, such as a surface sizing agent. Uncoated base papers, including unsized, conventionally sized, and lightly treated base papers, can be used. The substrate 110 may be simple in construction and devoid of glossy coatings, or of other substantial, functional coatings. The substrate 110 may, for example, be substantially uniform in composition throughout its thickness, rather than a multilayered construction or material to which one or more separate, functional coatings have already been applied. In some cases, however, it may be desirable to treat, prepare, or otherwise work the substrate 110 in preparation for coating onto it one or more of the other layers shown in the figure.

The basecoat 112 may be applied directly to the surface 110*a* of the substrate 110 before any other coatings are applied. The basecoat 112 may in some cases be characterized or described as a thermal insulating layer, a separator layer, a heat-reflective layer, an isolation layer, or a prime coat. By tailoring the layer 112 to have a thermal conductivity less than both the thermal conductivity of the thermally responsive layer 114 and the thermal conductivity of the substrate 110, the basecoat 112 provides a degree of thermal insulation between those two other layers. Such thermal insulation promotes image quality, imaging speed, or both, by ensuring that heat delivered by the thermal print head (not shown) at the front surface 104*a* is not substantially lost by thermal conduction through the thermally responsive layer 114 to the more massive substrate 110.

The basecoat 112 may comprise hollow sphere pigments (HSP), such as product code Ropaque™ TH-2000 or TH-500EF available from The Dow Chemical Company, or other suitable materials. The HSP is useful in lowering the thermal conductivity of the basecoat. The basecoat 112 can be made by a process in which a dispersion is coated onto the surface 110*a* of the substrate, and then dried. In some cases, the basecoat 112 may be eliminated and omitted from the product construction. When included as part of the recording material, the thermal insulating layer may have a thickness in a range from 2 to 12 μm, or other suitable thicknesses.

The thermally responsive layer 114 may be coated atop the basecoat 112, or atop the substrate 110 if the basecoat is omitted. The layer 114 may alternatively be referred to as a heat-sensitive color-forming layer. This layer 114 comprises a color-forming composition that is thermally sensitive, i.e., it changes color upon sufficient heating. The color-forming composition has two main components: a color-forming dye (electron-donating dye precursor), also known as a leuco dye or chromogenic material, and an acidic developer. The leuco dye and acidic developer are typically ground to individual particle sizes of between 1 to 10 micrometers, dispersed in a binder, and distributed homogeneously and in a contiguous relationship with each other throughout the layer 114. Sufficient heating at any position allows the particles of acidic developer to react with the particles of leuco dye which results in a color change at the site of the heating, usually from light to dark. Known systems and materials are described in U.S. Pat. No. 3,539,375 (Baum), U.S. Pat. No. 3,674,535 (Blose et al.), U.S. Pat. No. 3,746,675 (Blose et al.), U.S. Pat. No. 4,151,748 (Baum), U.S. Pat. No. 4,181,771 (Hanson et al.), U.S. Pat. No. 4,246,318 (Baum), U.S. Pat. No. 4,470,057 (Glanz), and U.S. Pat. No. 5,955,398 (Fisher et al.).

The acidic developer is preferably non-phenolic, and, as already explained above, advantageously includes a combination of two distinct non-phenolic developer materials, in particular, 1,3-diphenyl urea ("DPU"), and urea urethane ("UU"). DPU may alternatively be referred by names such as: 1-3-Diphenylurea or 1-3-diphenylurea; N,N'-Diphenylurea; Diphenylurea; Urea, N,N'-diphenyl-; CARBANILIDE; Diphenylcarbamide; or $C_{13}H_{12}N_2O$. UU may alternatively be referred by names such as: urethane urea; urethane-urea copolymer; polyurethane urea, or poly(urethane urea); polyurethane urea elastomer, or poly(urethane urea) elastomer; polyurea-urethane; poly(urea) urethane; poly(urea-urethane) polymer; poly(urea-urethane) thermoset; poly(ether urethane urea); poly(ester urethane urea); poly(ester urethane) urea elastomer; or $C_4H_{11}N_3O_3$.

One rationale for using developers that are non-phenolic in the thermally responsive layer 114 is to satisfy the market demand for phenol-free receipts, labels, and the like. As such, it is desirable in many cases, but not necessary in all cases, for not only the thermally responsive layer 114 to be phenol-free or substantially phenol-free, but for the entire direct thermal recording material 104 to be phenol-free or substantially phenol-free. We use the term substantially phenol-free to include both items that are absolutely and completely phenol-free, as well as items that may have only trace amounts of phenolic materials below thresholds.

Neither DPU nor UU is particularly noteworthy by itself when used with a suitable leuco dye. In fact, when UU is used with no other developer materials but with a suitable leuco dye in a thermally responsive layer, the resulting direct thermal recording material, when imaged by a direct thermal printer, produces an initial image that doesn't even meet the minimum requirement for bar code machine-readability. On the other hand when the UU in such a product is entirely replaced by DPU, i.e. when the DPU is used by itself as the only developer in the layer 114, the image initially produced by the direct thermal printer does meet the minimum requirement for bar code machine-readability, but no longer does so after the printed sample is subjected to any one of a number of environmental exposure tests as explained further below. Surprisingly, when DPU and UU are used in combination, and of course with a suitable leuco dye, the resulting direct thermal recording material not only provides a thermally produced image that meets the minimum requirement for bar code machine-readability, but also maintains that image quality after the printed sample is subjected to environmental exposure tests that are not passed by otherwise identical recording materials containing only DPU or only UU as the developer.

In embodiments that use the combination of DPU and UU, the DPU, the UU, and the selected leuco dye are each preferably dispersed homogeneously and evenly throughout the thermally responsive layer 114. This does not necessarily mean that these various materials have equal loadings in that layer. In most cases, however, we have found it desirable to have roughly equal loadings of the DPU and UU, i.e., a relative weight ratio of DPU/UU of roughly 1. But other weight ratios of DPU/UU can also be used as demonstrated in the examples below. The DPU/UU weight ratio may for example fall within a range from ⅓ to 3, or from ½ to 2, or it may be about 1. When the DPU and UU are used in combination, they are preferably the only chemical developers used in the layer 114. However, if desired, one or more other chemical developers may also be added besides the DPU and UU. If this is done, such other developer(s) are preferably individually and collectively present in the layer 114 in a weight percentage lower than that of DPU, and lower than that of UU.

Besides the DPU and UU, the thermally responsive layer 114 also of course includes at least one leuco dye tailored to react with the plurality of developers at elevated temperatures to produce a mark or color change. The leuco dye, or dyes, may be any known dye(s) capable of such a reaction. Examples include, without limitation:

- ODB-2 (CAS no. 89331-94-2, chemical name spiro (isobenzofuran-1(3H),9'-(9H)xanthen)-3-one, 6'-(ethyl (4-methylphenyl)amino)-3'-methyl-2'-(phenylamino)-);
- BK305 (CAS no. 129473-78-5, chemical name spiro (isobenzofuran-1(3H),9'-(9H)xanthen-3-one, 6'-(dipentylamino)-3'-methyl-2'-(phenylamino)-); and
- ETAC (CAS no. 59129-79-2, chemical name spiro (isobenzofuran-1(3H),9'-(9H)xanthen)-3-one, 6'-(ethyl (4-methylphenyl)amino)-3'-methyl-2'-(phenylamino)-).

The thermally responsive layer 114 also includes one or more suitable binders to help hold the particles in the layer together. Such binders may include poly(vinylalcohol), hydroxy ethylcellulose, methylcellulose, isopropyl cellulose, starch, modified starches, gelatin, and the like. Latex materials including polyacrylates, polyvinylacetates, polystyrene, and the like, may also be used. The binder helps maintain the mechanical integrity of the layer 114 in response to brushing or handling forces resulting from use or storage of the recording material 104. Enough of the binder should be present to provide such protection, but not so much so as to interfere with achieving reactive contact between the color-forming reactive materials. The binder may be present at 5 to 30 wt % of the dried coating.

In addition to the leuco dye, the developers, and the binder, the color-forming composition of the layer 114 may also contain one or more materials referred to as modifiers, which aid in color formation. The modifier(s) can function by one or both of (a) lowering the melting point of the dye/developer, and (b) acting as a type of solvent in which the dye and developer dissolve or melt. The modifier(s) may thus facilitate the reaction between the leuco dye and the developer to produce a more intense thermal image, faster imaging, or both. See, for example, U.S. Pat. No. 4,531,140 (Suzuki et al.), U.S. Pat. No. 4,794,102 (Petersen et al.), U.S. Pat. No. 5,098,882 (Teraji et al.), U.S. Pat. No. 6,835,691 (Mathiaparanam et al.), and U.S. Pat. No. 6,921,740 (Hizatate et al.).

Ordinarily, the thermally responsive layer of a conventional direct thermal recording material would be applied in a thickness corresponding to a coat weight from 1.5 to 6 pounds/3,300 $ft^2$ (2.2 to 8.9 $g/m^2$), or more typically from 2-4 pounds/3,300 $ft^2$ (3.0 to 5.9 $g/m^2$), for a finished dry thickness in a range from 1.2 to 4.8 or from 1 to 5 μm. A practical lower limit has been a coat weight of about 1 pound/33,000 $ft^2$ (~1.48 $g/m^2$). The thermally responsive layer 114 of the inventive recording material 104 may also if desired be applied in these same conventional coat weights and thicknesses, but we have found that another benefit of the disclosed combination of developers DPU/UU is that the layer 114 can be made much thinner while still providing acceptable thermal image quality. In particular, the layer 114 can be made with a coat weight of less than 1 pound/3,300 $ft^2$ (1.48 $g/m^2$). We have demonstrated acceptable product performance with the coat weight of the layer 114 (containing DPU and UU developers) as low as 0.9 $g/m^2$. The coat weight of the layer 114 may thus be in a range from, for example, 0.9 to 8.9 $g/m^2$, or 0.9 to 5.9 $g/m^2$, or 0.9 to 2.2 $g/m^2$, or 0.9 to 1.48 $g/m^2$, or 0.9 up to, but less than, 1.48 $g/m^2$.

The ability to make the thermally responsive layer 114 ultra-thin has a number of benefits such as lower product weight/mass, lower product cost, and reduced environmental impact in terms of the post-use waste stream.

Turning again to FIG. 2, a topcoat layer 116 is shown atop, in contact with, the thermally responsive layer 114. In the embodiment illustrated, the outer major surface of the topcoat 116 is exposed to air and corresponds to the outer major surface 104*a* of the direct thermal recording material 104. The topcoat 116 is optional and can be omitted if desired. If it is included, it can protect underlying layers of the recording material 104 from unwanted contaminants or substances. For example, some topcoats can be used as barriers or seals against seepage by oils or other unwanted liquids.

Figure 2:
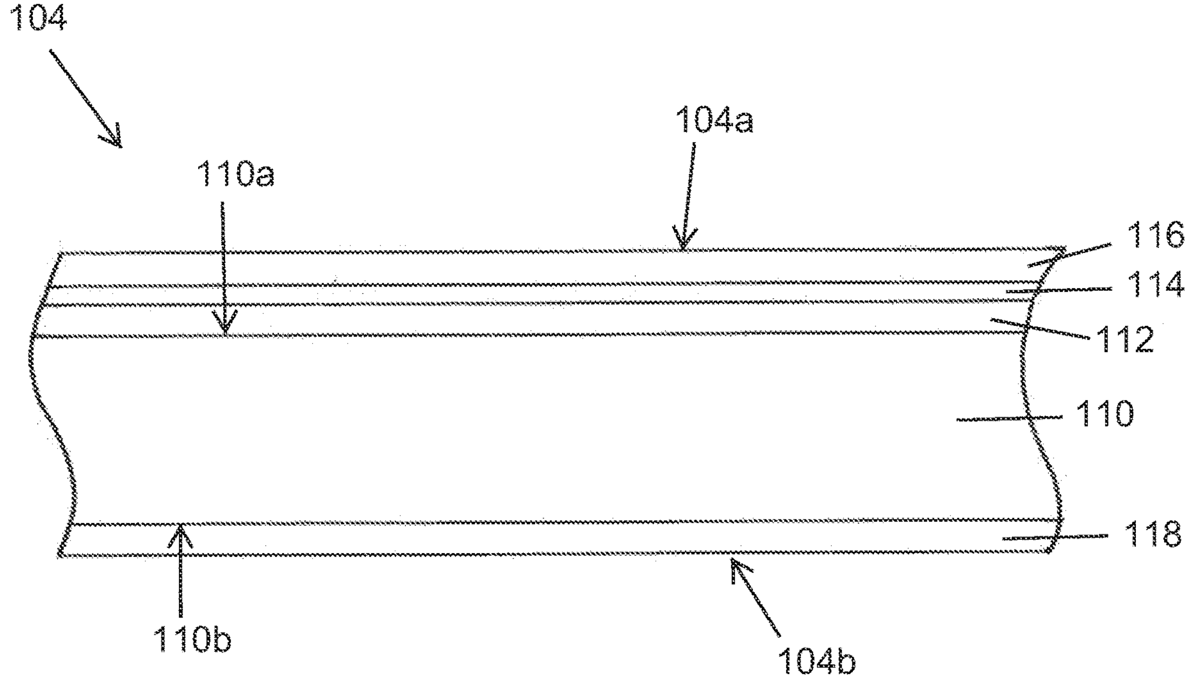
FIG. 2 is a magnified schematic front elevation view, which also serves as a schematic cross-sectional view, of a direct thermal recording material.

The topcoat 116 may be any suitable topcoat of conventional design. The topcoat 116 may for example comprise binders such as modified or unmodified polyvinyl alcohols, acrylic binders, crosslinkers, lubricants, and fillers such as aluminum trihydrate and/or silicas. The topcoat 116 may have a thickness in a range from 0.5 to 2 μm, or other suitable thicknesses. The disclosed recording materials may also include additional layers and coatings other than those discussed above. Such other layers or coatings include coating(s) that can be applied to the back surface 110*b* of the substrate 110. One such layer is illustrated in FIG. 2, labeled 118. This layer 118 may be an adhesive layer comprising a pressure sensitive adhesive (PSA), hot melt adhesive, or other suitable adhesive. By providing it on the back side of the recording material 104, the recording material can serve as a label and can attach to containers, films, or other bodies while having its front, thermally printed side visible to users. A release liner (not shown) can also be included to cover a PSA layer until ready for use. Release coatings may also be applied to the surface for applications that do not require a liner.

Direct thermal recording materials can potentially be used in a variety of settings and, as such, can be exposed to a wide variety of environmental agents, contaminants, and conditions. Images formed by direct thermal printing on such materials are known to be subject to degradation when exposed to at least some of those conditions. A given recording material may experience degradation to more or fewer of these conditions depending on its details of construction, including the chemicals used in the thermally responsive layer. Of course, the more environmental conditions the recording material can withstand without substantial degradation of the image, the more settings and applications it can be used in.

Dry heat: one environmental condition of interest is exposure of the imaged material to heat, i.e., heat stability. Of course, if an imaged recording material is heated to a high enough temperature, e.g. approaching a print head temperature of at least about 200° C., the leuco dye will react with the developer throughout the entire thermally responsive layer, causing the entire front surface of the recording material to change color and obliterating any image that was previously formed thereon. Here we are instead concerned with a heated environment substantially above ambient room temperature but in the neighborhood of 60° C., which an imaged recording material may experience if attached as a label to a cup or container of coffee or other hot beverage, or if attached to the package of a food item meant to be heated or cooked in a microwave oven.

Plasticizer: another environmental condition of interest is contact with a plasticized film, especially polyvinyl chloride (PVC) film used to wrap meat in grocery stores. Direct thermal recording materials can be used as labels applied to such packaged meat. The direct thermal image printed on the front of the label can come into contact with PVC film from other packages.

Water: another environmental condition of interest is immersion in water. This may happen if a printed receipt or ticket is left in a pocket of clothing and inadvertently sent through the cycle of a washing machine. The most benign version of this environmental condition is where the water is at room temperature, or possibly tepid.

Boiling water: this environmental condition of interest is like the water immersion condition, but where the water is at the boiling temperature.

Sultry: another sultry environmental condition of interest is exposure to hot, humid conditions as may be experienced in tropical areas. This may for example involve temperatures around 40° C. and a relative humidity of 90%.

Sunlight: another environmental condition of interest is exposure to sunlight.

Sanitizer: another environmental condition of interest is contact with alcohol-based hand sanitizer fluids.

EXAMPLES AND COMPARATIVE EXAMPLES

In accordance with the foregoing teachings, a number of direct thermal recording media examples and comparative examples were fabricated and tested.

In preparation for making the samples, a number of dispersion formulations were prepared. These were of two types: dispersion formulations for leuco dyes, and dispersion formulations for acidic developers. The formulations for the leuco dyes followed a first recipe, “A”, and formulations for the developers followed a second recipe, “B”, as follows, where all parts or percentages are understood to be parts per weight:

TABLE 1

Dispersion A Formulation

| Material | Parts |
|---|---|
| chromogenic material (leuco dye) | 30.0 |
| binder, 20% solution of polyvinyl alcohol in water | 25.0 |
| defoaming and dispersing agents | 0.4 |
| water | 44.6 |

TABLE 2

Dispersion B Formulation

| Material | Parts |
|---|---|
| developer material | 38.0 |
| binder, 20% solution of polyvinyl alcohol in water | 18.0 |
| defoaming and dispersing agents | 0.4 |
| water | 43.6 |

A formulation referred to as Dispersion A1 followed recipe “A” and used ODB-2, i.e., 2-anilino-3-methyl-6-dibutylaminofluoran, as the chromogenic material.

A formulation referred to as Dispersion A2 followed recipe “A” and used BK-305, i.e., 2-anilino-3-methyl-6-dipentylaminofluoran, as the chromogenic material.

A formulation referred to as Dispersion B1 followed recipe “B” and used DPU, i.e., 1,3-Diphenyl Urea, as the developer material.

A formulation referred to as Dispersion B2 followed recipe “B” and used UU, i.e., urethane urea (in particular Urea Urethane Compound sold by Chemipro Kasei Kaisha Ltd., CAS No. 321860-75-7), as the developer material.

A formulation referred to as Dispersion B3 followed recipe “B” and used D-8, i.e., 4-Hydroxyphenyl-4-iso-propoxyphenylsulfone, as the developer material.

A formulation referred to as Dispersion B4 followed recipe “B” and used BPS, i.e., 4-Hydroxyphenyl sulfone, as the developer material.

A formulation referred to as Dispersion B5 followed recipe “B” and used BPS-MBE, i.e., 4-Benzyloxyphenyl-4'-hydroxyphenyl sulfone, as the developer material.

A formulation referred to as Dispersion B6 followed recipe “B” and used Tolbutamide, i.e., 1-butyl-3-(4-methyl phenyl) sulfonyl urea, as the developer material.

A formulation referred to as Dispersion B7 followed recipe “B” and used Dapsone, i.e., 4,4'-Diamino Diphenyl Sulfone, as the developer material.

A formulation referred to as Dispersion B8 followed recipe “B” and used Pergafast™ 201, i.e., N-(p-Toluene-sulfonyl)-N'-(3-p-toluenesulfonyloxyphenyl) urea, sold by Solenis LLC, as the developer material.

A formulation referred to as Dispersion B9 followed recipe “B” and used NKK-1304, i.e., N-[2-(3-Phenylureido) phenyl] benzenensulfonamide, sold by Nippon Soda Co. Ltd., as the developer material.

Different ones of these dispersion formulations were mixed together with other ingredients to create a coating formulation for use in forming the thermally responsive layer of a given sample. The coating formulation was as follows unless otherwise indicated:

TABLE 3

Coating Formulation for Thermally Responsive Layer

| Material | Parts |
|---|---|
| Dispersion A (chromogenic material/leuco dye) | 22.0 |
| Dispersion B (developer) | 38.0 |
| binder, 10% solution of polyvinyl alcohol in water | 25.0 |
| Filler slurry, 30% in water | 15.0 |

Each sample (example or comparative example) was made in the following manner unless otherwise indicated. The first step was to coat a basecoat (see e.g. layer 112 in FIG. 2) onto one side or major surface of a substrate (see e.g. substrate 110 in FIG. 2). The substrate used was a 63 g/m$^2$ (gsm) highly refined paper sheet. The basecoat was thermally insulating and comprised a mixture of calcined clay such as Ansilex 93 by BASF Corporation, and Ropaque™ TH-2000 hollow sphere pigment (HSP) by The Dow Chemical Company, along with an SBR binder, and was applied at a coat weight of 4.5 g/m$^2$. After drying, a thermally-responsive layer (see e.g. layer 114 in FIG. 2) was coated atop the basecoat. The coat weight of the thermally-responsive layer was 1.3 g/m$^2$ unless otherwise indicated. After this coating was dry, a topcoat (see e.g. topcoat 116 in FIG. 2) was coated onto the surface of the thermally-responsive layer. The topcoat was composed of delaminated clay, PVOH, crosslinker, and lubricant such as zinc stearate, and was applied at a coat weight of 1.5 g/m$^2$. After the topcoat was dry, no other coatings were applied to the sample, and the sample was ready for thermal printing and testing.

The following table shows the names given to the various samples (Examples 1 through 6 and Comparative Examples 1 through 12) that were made and tested, and the details of their respective thermally responsive layers:

TABLE 4

Sample Names and Details Regarding Thermally Responsive Layer

| Sample name | Dispersion A (leuco dye) | Dispersion B (developer) | Comment re Dispersion B | coat weight |
|---|---|---|---|---|
| Ex 1 | A1 | B1 and B2 | 1:1 ratio, B1 and B2 at 19 parts each | 1.3 |
| Ex 2 | A2 | B1 and B2 | 1:1 ratio, B1 and B2 at 19 parts each | 1.3 |
| Ex 3 | A2 | B1 and B2 | 1:3 ratio, B1 at 9.5, B2 at 28.5 parts | 1.3 |
| Ex 4 | A2 | B1 and B2 | 3:1 ratio, B1 at 28.5, B2 at 9.5 parts | 1.3 |
| Ex 5 | A1 | B1 and B2 | 1:1 ratio, B1 and B2 at 19 parts each | 1.1 |
| Ex 6 | A1 | B1 and B2 | 1:1 ratio, B1 and B2 at 19 parts each | 0.9 |
| CE1 | A1 | B1 | | 1.3 |
| CE2 | A1 | B2 | | 1.3 |
| CE3 | A2 | B1 | | 1.3 |
| CE4 | A2 | B2 | | 1.3 |
| CE5 | A1 | B3 | | 1.3 |
| CE6 | A1 | B4 | | 1.3 |
| CE7 | A1 | B5 | | 1.3 |
| CE8 | A1 | B8 | | 1.3 |
| CE9 | A1 | B9 | | 1.3 |
| CE10 | A1 | B6 and B7 | 1:1 ratio, B6 and B7 at 19 parts each | 1.3 |
| CE11 | A1 | B1 and B8 | 1:1 ratio, B1 and B8 at 19 parts each | 1.3 |
| CE12 | A1 | B1 and B9 | 1:1 ratio, B1 and B9 at 19 parts each | 1.3 |

All of these samples were thin and flexible, phenol-free, and their front surfaces were uniformly white or light in color. Each sample was then tested for its ability to form an image by direct thermal printing, the print quality of that image, and the print quality of the image after subjecting the printed sample to a number of different environmental tests.

The thermal printing was performed on each sample using a Zebra thermal printer, model 140-401, at a speed of 6 inches per second (ips) and using the default energy setting of the print head, which was 11.7 mJ/mm$^2$. The printed image was in each case a barcode pattern. The print quality or image quality of the barcode pattern was evaluated using a TruCheck™ barcode verifier (model TC-843) operating at a wavelength of 650 nm, a passing result corresponding to an ANSI value of 1.5 or more, and a failing result corresponding to an ANSI value of less than 1.5. In some cases, the print quality of the same image was also evaluated at 670 nm using a TruCheck™ barcode verifier model TC-854, where again a passing score corresponded to an ANSI value of 1.5 or more, and a failing score corresponded to an ANSI value of less than 1.5.

After the initial print quality of the printed recording medium was measured, a specimen of each sample was subjected to each of the seven environmental tests outlined above, namely: dry heat; plasticizer; water; boiling water; sultry; sunlight; and sanitizer.

For the dry heat test, the printed specimen was exposed to 60° C. (dry) heat for 24 hours, then removed from the heat. After this test the quality of the printed image was tested at both 650 nm and 670 nm.

For the plasticizer test, the printed specimen was dipped in room temperature water, then removed and placed in contact with a polyvinyl chloride meat wrapping film under a 7 pound weight for 24 hours, then removed and allowed to dry. After this test the quality of the printed image was tested at 650 nm.

For the water test, the printed specimen was soaked in room temperature water for 24 hours, then removed and allowed to dry. After this test the quality of the printed image was tested at 650 nm.

For the boiling water test, the printed specimen was adhered to a plastic swatch and submerged in boiling water for 20 minutes, then removed and allowed to dry. After this test the quality of the printed image was tested at 650 nm.

For the sultry test, the printed specimen was exposed to 40° C. heat and 90% relative humidity for 24 hours. After this test the quality of the printed image was tested at both 650 nm and 670 nm.

For the sunlight test, the printed specimen was placed into an accelerated sunlight test chamber (Q-Sun™ Xenon test chamber, sold by Q-Lab Corporation, Westlake, OH) at an irradiance of 0.67 W/m$^2$ for 7 hours, then removed. After this test the quality of the printed image was tested at both 650 nm and 670 nm.

For the sanitizer test, one drop of Purell™ hand sanitizer, sold by Gojo Industries, was placed on the printed specimen and allowed to dry. After this test the quality of the printed image was tested at both 650 nm and 670 nm.

The results of some of these sample runs, the initial print quality test, and the print quality tests after each of the above-described environmental tests, are reported in Table 5:

TABLE 5

| | | | | ANSI test results onorinted barcode image | | | | | | | |
|---|---|---|---|---|---|---|---|---|---|---|---|
| Example | dye | Developer | ctwt | initial | water | wet pvc | hot water | heat | 40/90 RH | Sun-light | sani-tizer |
| CE1 | ODB2 | DPU | 1.3 | pass | pass | fail | fail | fail | fail | pass | fail |
| CE2 | ODB2 | UU | 1.3 | fail | fail | fail | fail | fail | fail | fail | fail |
| CE3 | BK305 | DPU | 1.3 | pass | pass | fail | fail | fail | fail | pass | fail |
| CE4 | BK305 | UU | 1.3 | fail | fail | fail | fail | fail | fail | fail | fail |
| Ex 1 | ODB2 | 1:1 DPU/UU | 1.3 | pass | pass | pass | pass | pass | pass | pass | pass |
| Ex 2 | BK305 | 1:1 DPU/UU | 1.3 | pass | pass | pass | pass | pass | pass | pass | pass |
| Ex 3 | BK305 | 1:3 DPU/UU | 1.3 | pass | pass | pass | fail | pass | pass* | pass* | pass* |
| Ex 4 | BK305 | 3:1 DPU/UU | 1.3 | pass | pass | fail | fail | pass | pass* | pass | fail |
| Ex 5 | ODB2 | 1:1 DPU/UU | 1.1 | pass | pass | pass | pass | pass | pass | pass | pass |
| Ex 6 | ODB2 | 1:1 DPU/UU | 0.9 | pass | pass | pass | fail | pass | pass | pass | fail |

In this table, a "pass" result refers to an ANSI value at 650 nm (and at 670 nm where applicable) of at least 1.5; a "pass*" result refers to an ANSI value at 650 nm of at least 1.5 but an ANSI value at 670 nm below 1.5; and a "fail" result refers to an ANSI value at 650 nm (and at 670 nm where applicable) of less than 1.5.

A comparison of Comparative Examples 1-4 with Examples 1-6 in the table demonstrate that the new developer chemistry combination of DPU and UU can produce a multi-purpose direct thermal recording material capable of passing a plurality of environmental exposure tests, but when used individually in an otherwise identical thermal recording material, cannot pass those same environmental exposure tests. The comparative examples that use UU by itself yield direct thermal recording materials which produce an image that does not meet even the minimum standard for machine-readability for bar codes.

The results of Table 5 demonstrate that the relative weight ratio of DPU to UU in the thermally responsive layer need not be 1 but can range at least from ⅓ to 3, as well as narrower ranges such as ½ to 2. The results of Table 5 further demonstrate that the coat weight of the thermally responsive layer, when DPU and UU are used in combination, can be as low as 0.9 g/m$^2$ and still produce direct thermal images with acceptable print quality.

The results of the remaining comparative examples are shown in Table 6, where "pass", "pass", and "fail" have the same meanings as in Table 5:

TABLE 6

| | | | | ANSI test results on printed barcode image | | | | | | | |
|---|---|---|---|---|---|---|---|---|---|---|---|
| Example | dye | developer | ctwt | initial | water | wet pvc | hot water | heat | 40/90 RH | Sun-light | sani-tizer |
| CE5 | ODB2 | D-8 | 1.3 | pass | pass | fail | fail | pass | pass | pass | fail |
| CE6 | ODB2 | BPS | 1.3 | pass | pass | fail | fail | pass | pass | pass | fail |
| CE7 | ODB2 | BPS-MBE | 1.3 | pass | pass | fail | fail | pass | pass | pass* | fail |
| CE8 | ODB2 | Perg | 1.3 | pass | pass | fail | fail | pass | pass | pass* | fail |
| CE9 | ODB2 | NKK | 1.3 | pass | pass | fail | fail | pass | pass | pass | fail |
| CE10 | ODB2 | 1:1 Tol/Daps | 1.3 | fail | fail | fail | fail | fail | fail | fail | fail |
| CE11 | ODB2 | 1:1 DPU/Perg | 1.3 | pass | pass | fail | fail | pass | fail | pass | fail |
| CE12 | ODB2 | 1:1 DPU:NKK | 1.3 | pass | pass | fail | fail | pass | pass | pass | fail |

Unless otherwise indicated, all numbers expressing quantities, measured properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

The use of relational terms such as "top", "bottom", "upper", "lower", "above", "below", and the like to describe various embodiments are merely used for convenience to facilitate the description of some embodiments herein. Notwithstanding the use of such terms, the present disclosure should not be interpreted as being limited to any particular orientation or relative position, but rather should be understood to encompass embodiments having any orientations and relative positions, in addition to those described above.

Various modifications and alterations of this invention will be apparent to those skilled in the art without departing from the spirit and scope of this invention, which is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

What is claimed is:

1. A recordable medium, comprising:

a substrate; and a thermally responsive layer carried by the substrate, the thermally responsive layer including a leuco dye and a plurality of developers;

wherein the recording medium is substantially phenol-free;

wherein the plurality of developers include 1,3-Diphenyl urea (DPU) and a urea urethane having the CAS No. 321860-75-7 (UU);

wherein the DPU and the UU are present in the thermally responsive layer in a relative weight ratio that falls within a range from ⅓ to 3;

wherein the thermally responsive layer has a coat weight of less than or equal to 1.3 $g/m^2$ and at least 0.9 $g/m^2$; and wherein a print quality of the recording medium when printed is characterized by an ANSI value of at least 1.5 after the printed recording medium is heated to 60° C. for at least 24 hours, then removed and cooled.

2. The medium of claim 1, further comprising:

a basecoat layer between the thermally responsive layer and the substrate.

3. The medium of claim 1, further comprising:

a topcoat carried by the substrate such that the thermally responsive layer is disposed between the topcoat and the substrate.

4. The medium of claim 1, wherein the DPU and the UU are dispersed throughout the thermally responsive layer.

5. The medium of claim 1, wherein no developers other than DPU and UU are present in the thermally responsive layer.

6. The medium of claim 1, wherein the DPU and the UU are present in the thermally responsive layer in a relative weight ratio that falls within a range from 1:1 to 3:1.

7. The medium of claim 6, wherein the relative weight ratio falls within a range from ½ to 2.

8. The medium of claim 7, wherein the relative weight ratio is 1.

9. The medium of claim 1, wherein a print quality of the recording medium when printed with a thermal printer energy setting of 11.7 $mJ/mm^2$ at a print speed of 6 inches per second (ips) is characterized by an ANSI value of at least 1.5.

10. The medium of claim 9, wherein the print quality of the printed recording medium is characterized by an ANSI value of at least 1.5 after the printed recording medium is soaked in water for 24 hours and then removed and dried.

11. The medium of claim 9, wherein the print quality of the printed recording medium is characterized by an ANSI value of at least 1.5 after the printed recording medium is dipped in water, then placed in contact with polyvinyl chloride meat wrapping film under a 7 pound weight for 24 hours, and then removed and dried.

12. The medium of claim 9, wherein the print quality of the printed recording medium is characterized by an ANSI value of at least 1.5 after the printed recording medium is submerged in boiling water for 20 minutes, then removed and dried.

13. The medium of claim 9, wherein the print quality of the printed recording medium is characterized by an ANSI value of at least 1.5 after the printed recording medium is exposed to air at 40° C. and 90% relative humidity for 24 hours, then removed and cooled.

14. The medium of claim 9, wherein the print quality of the printed recording medium is characterized by an ANSI value of at least 1.5 after the printed recording medium is subjected to an accelerated sunlight test at 0.67 $W/m^2$ for 7 hours, then removed.

15. The medium of claim 11, wherein the print quality of the printed recording medium is characterized by an ANSI value of at least 1.5 after one drop of a 70% ethyl alcohol-based hand sanitizer is placed on the printed recording medium and allowed to dry.

16. A substantially phenol-free recording medium, comprising:

a flexible substrate; and a thermally responsive layer carried by the substrate, the thermally responsive layer including a leuco dye and a plurality of developers;

wherein the plurality of developers include 1,3-Diphenyl urea (DPU) and a urea urethane having the CAS No. 321860-75-7 (UU);

wherein the DPU and the UU are both dispersed throughout the thermally responsive layer;

wherein the DPU and the UU are present in the thermally responsive layer in a relative weight ratio that falls within a range from ⅓ to 3;

wherein the thermally responsive layer has a coat weight of less than or equal to 1.3 $g/m^2$ and at least 0.9 $g/m^2$;

wherein a print quality of the recording medium when printed with a thermal printer energy setting of 11.7 $mJ/mm^2$ at a print speed of 6 inches per second (ips) is characterized by an ANSI value of at least 1.5; and wherein the print quality of the printed recording medium is characterized by an ANSI value of at least 1.5 after the printed recording medium is heated to 60° C. for at least 24 hours, then removed and cooled.

17. The medium of claim 16, wherein the print quality of the printed recording medium is characterized by an ANSI value of at least 1.5 after the printed recording medium is dipped in water, then placed in contact with polyvinyl chloride meat wrapping film under a 7 pound weight for 24 hours, and then removed and dried; and wherein the print quality of the printed recording medium is characterized by an ANSI value of at least 1.5 after the printed recording medium is exposed to air at 40° C. and 90% relative humidity for 24 hours, then removed and cooled.

18. The medium of claim 16, wherein the DPU and the UU are present in the thermally responsive layer in a relative weight ratio that falls within a range from 1:1 to 3:1.

* * * * *